May 7, 1929.                J. C. PATERSON                1,711,576
                          CONVEYING APPARATUS
                           Filed Jan. 3, 1928

Inventor:
JOHN CURRIE PATERSON
by his Attorney:

Patented May 7, 1929.

1,711,576

UNITED STATES PATENT OFFICE.

JOHN CURRIE PATERSON, OF LONDON, ENGLAND, ASSIGNOR TO BAKER PERKINS CO. INC., OF SAGINAW, MICHIGAN, A CORPORATION OF NEW YORK.

CONVEYING APPARATUS.

Application filed January 3, 1928, Serial No. 244,264, and in Great Britain January 11, 1927.

This invention relates to conveying apparatus employing webs, bands, chains of equivalents usually of the endless variety which are driven by gearing, for instance of the variable speed type, commonly enclosed within the framing of the apparatus and entirely or partially covered by a bed or table over which the web or webs pass in their function. As a particular example of such apparatus to which the present invention is particularly adaptable may be mentioned automatic biscuit cutting or moulding machines in which a sheet of dough is fed by an endless web passing over a table, frame or equivalent to mechanism which cuts or moulds the biscuits on the same or on another web. Such machines have gearing for various purposes in the base beneath the conveyor, to which gearing access has to be obtained for inspection, adjustment, repair or otherwise. The web or webs being driven by variable speed gearing arranged below the table and enclosed by the machine framing, renders this and other gearing difficult of access.

The present invention aims to provide means by which, in apparatus or machines of the type above set forth, ready access may be had to the gearing or mechanism in the base of the machine; and for this purpose the invention consists in constructing or arranging the web supporting table, frame or the like or part thereof above or adjacent the driving mechanism to be readily movable, in such a manner as to provide easy access to said driving mechanism. As an example the said table or part thereof may be tilted, as by being hinged at one end and liftable, so that the driving mechanism is sufficiently disclosed for the purposes stated.

Means must be devised for readily disconnecting the web actuating devices from the driving mechanism when said table is shifted, and for as readily re-engaging said devices again when the table is returned to normal position. As one example for use with a hinged or tilting table, the latter may carry driving rollers for the conveyor operated by worm gearing movable with the table to be disengaged from operative relation with the driving mechanism when the table is raised and, when lowered, to reassume its position in proper driving relation with said mechanism.

Figure 1:
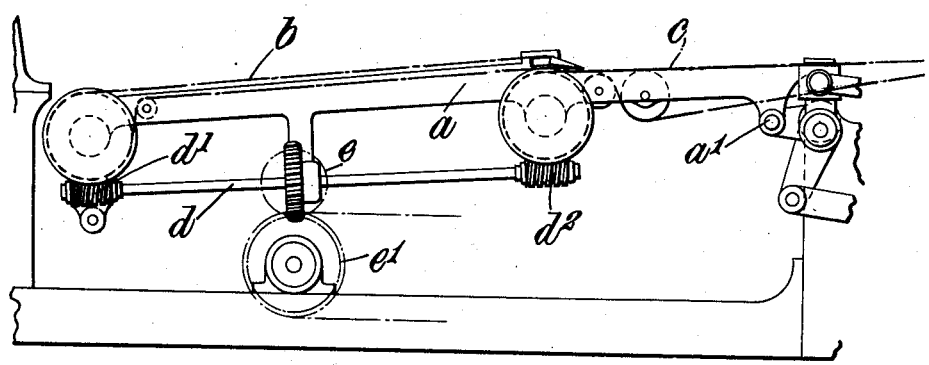
Figure 2:
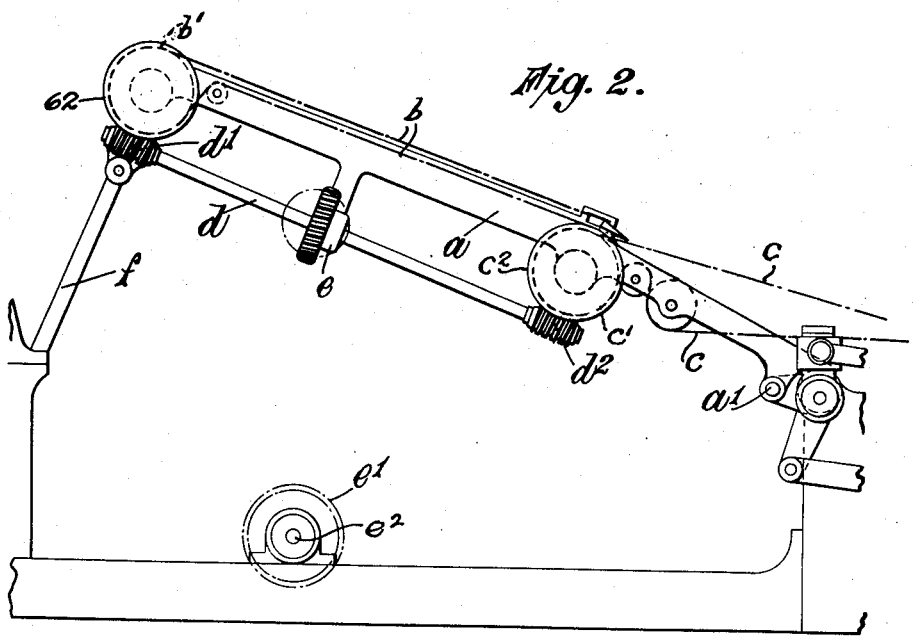

In the accompanying drawing, which illustrates by way of example the preferred form of the invention as applied to a biscuit cutting or moulding machine in which the table is tiltable:

Fig. 1 is a diagrammatic side elevation showing the table in normal position and Fig. 2 is a similar view showing the table in raised position.

$a$ is a supporting table pivoted at or adjacent its delivery end as at $a^1$ to an associated cutting machine, over which table pass endless conveyors $b$, $c$ common to the type of machine above referred to. The conveyor $b$ is driven by the drum $b^1$ on the shaft of which is a worm wheel $b^2$ driven by worm $d^1$ in the shaft $d$. The conveyor $c$ is driven by the drum $c^1$ on the shaft of which is a worm wheel $c^2$ driven by worm $d^2$ on the shaft $d$. The conveyors $b$ $c$ in the normal position of the table are driven through the countershaft $d$ on the underside of said table by worm wheel $e$ meshing with worm $e^1$ on the shaft $e^2$.

When for purposes of inspection, adjustment or repair of the various mechanisms located beneath the table, said table $a$ is raised about its pivot $a^1$, it may be conveniently held in its raised position by a stay or equivalent $f$, the drive through the gears $e^1$ and $e$ being disconnected.

What I claim as my invention and desire to secure by Letters Patent of the United States is:—

1. In conveying apparatus, the combination of a frame, a conveyor support movable relatively thereto, conveyor-carrying means mounted on said support, an endless flexible conveyor carried by said means, conveyor-traversing means also carried by said support, and gearing for driving said traversing means; said gearing comprising separable interengaging parts carried by the support and the frame, respectively.

2. In conveying apparatus, the combination of a frame, a table movable relatively thereto, an endless flexible conveyor mounted on said table, means carried by said table for supporting said conveyor, means also carried by the table for traversing the conveyor, and gearing for driving said traversing means; said gearing comprising separable interengaging gears carried by the table and the frame, respectively.

3. In conveying apparatus, the combination of a frame, a table hingedly mounted for swinging movement relatively to the frame, an endless flexible conveyor mounted on said table, means carried by said table for supporting said conveyor, means also carried by the table for traversing the conveyor, and gearing for driving said traversing means; said gearing comprising separable interengaging gears carried by the table and the frame, respectively.

4. In conveying apparatus, the combination of a frame, a table movable relatively thereto, alining endless conveyors extending longitudinally over the table, means carried by said table for supporting one conveyor, means also carried by the table for traversing said conveyor, means for supporting another of said conveyors, and gearing for driving said traversing means; said gearing comprising separable interengaging gears carried by the table and the frame, respectively.

5. Conveying apparatus, according to claim 2, in which the conveyor-supporting means includes a drum carried by the table; and in which the traversing means includes a shaft mounted on the under side of the table and having a driving connection with said drum, said shaft also carrying one of the separable interengaging gears.

In witness whereof I have signed this specification.

JOHN CURRIE PATERSON.